United States Patent [19]

Litt et al.

[11] 3,970,234

[45] July 20, 1976

[54] VACUUM DESOLDERING DEVICE FOR SOLDERING IRONS

[75] Inventors: Kenneth C. Litt; William J. Siegel, both of Silver Spring, Md.

[73] Assignee: Pace, Incorporated, Silver Spring, Md.

[22] Filed: Aug. 23, 1974

[21] Appl. No.: 499,997

[52] U.S. Cl. ............................................. 228/20
[51] Int. Cl.[2] ....................................... B23K 37/00
[58] Field of Search ................ 228/20, 55; 219/230

[56] References Cited
UNITED STATES PATENTS

| | | | |
|---|---|---|---|
| 3,163,145 | 12/1964 | Duhaime et al. | 228/20 |
| 3,259,293 | 7/1966 | Dezzani | 228/20 |
| 3,690,539 | 9/1972 | Geiger | 228/20 |
| 3,800,122 | 3/1974 | Farmer | 219/239 |

FOREIGN PATENTS OR APPLICATIONS

6,601,198  8/1966  Netherlands........................... 228/20

Primary Examiner—Al Lawrence Smith
Assistant Examiner—K. J. Ramsey
Attorney, Agent, or Firm—Gerald J. Ferguson, Jr.; Joseph J. Baker

[57] ABSTRACT

A desoldering device is disclosed which can be connected to a plurality of different pencil type soldering irons having a removable soldering tip. The device comprises a head member with an adaptor which can be secured to the soldering iron after the soldering tip has been removed. The head member has a through passage in which is positioned a hollow tube and copper tip. A base member is secured to the hollow tube and supports a glass container for receiving softened solder. A source of suction is connected to the base member for drawing the softened solder through the hollow tip and tube and depositing it in the glass container.

10 Claims, 3 Drawing Figures

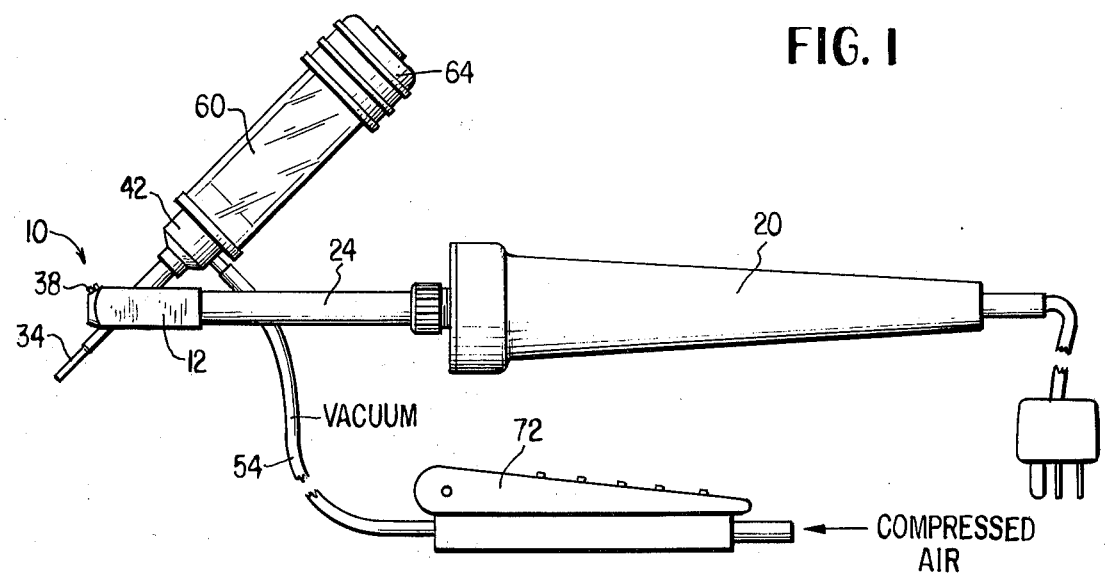
FIG. 1
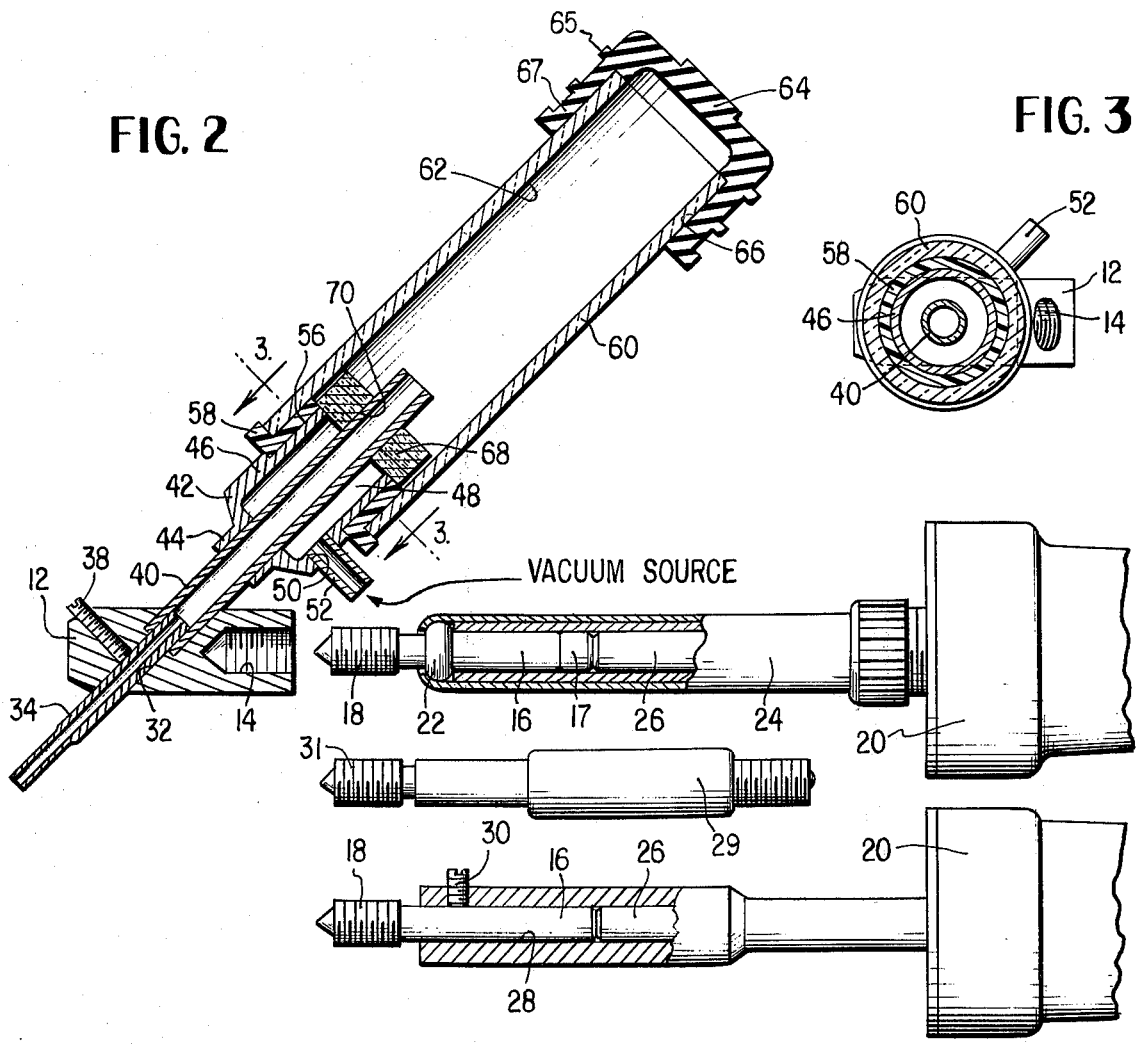
FIG. 2
FIG. 3

VACUUM DESOLDERING DEVICE FOR SOLDERING IRONS

BACKGROUND OF THE INVENTION

The present invention relates to a vacuum operated desoldering device and more particularly to such a device which is adaptable for use with a plurality of different pencil type soldering irons to form a desoldering tool.

Present desoldering devices though capable of removing solder from soldered joints have numerous drawbacks due to their construction, method of use and overall cost to purchase and maintain. Such desoldering devices of the prior art are either integrally connected to the heating element as disclosed in U.S. Pat. No. 2,609,778 or the devices are adapted to be connected to only one particular type or make of soldering iron as disclosed in U.S. Pat. No. 3,172,382. When such tools are used on manufacturing assembly lines, repair shops or the like, they are normally energized continuously for long periods of time resulting in the rapid deterioration of the heating elements and subsequent costly repair or replacement of the entire tool. Where it is occasionally desirable to have an efficient desoldering capability it is costly to purchase and maintain separate tools for both soldering and desoldering as is presently required.

It is therefore a primary object of the present invention to provide a device for removing old solder or excess solder from soldered joints which can be quickly and easily attached to a plurality of different conventional soldering irons of the pencil type.

It is another object of the present invention to provide a device which is of simple construction and can be readily disassembled and cleaned.

It is a still further object of the present invention to provide a vacuum desoldering device which can be operated from a remote position by a treadle or the like so that the operator can have his hands free to manipulate the device and workpiece.

Other features and advantages of the invention will be apparent from the specification and claims when considered in connection with the accompanying drawings in which:

FIG. 1 is a perspective view of the desoldering device of the present invention connected to a conventional pencil type solder iron with the soldering tip removed.

FIG. 2 is an enlarged sectional view of the desoldering device and various conventional pencil type soldering irons to which it can be attached.

FIG. 3 is a view in cross-section of the desoldering device in FIG. 2 taken along the lines 3—3.

DETAILED DESCRIPTION OF THE PREFERRED EMBODIMENT

Referring now to the drawings, throughout which like reference characters designate like parts, the invention comprises briefly a vacuum operated desoldering device which can be connected to a plurality of different conventional pencil type soldering irons by means of an adaptor. The vacuum sucks softened solder through a tip and deposits it in a receiving tube.

More specifically, our desoldering device 10 comprises a head member 12 which has a threaded longitudinal bore 14 extending inwardly from one end thereof. An adaptor 16 in the form of a short rod is provided having a threaded end 18 which mates with the treaded bore 14 to secure the adaptor 16 to the head member 12. It should also be understood that it is within the scope of the present invention to eliminate the threads in the longitudinal bore 14 and on the end 18 of the adaptor 16 and provide the end 18 with a cylindrical, rectangular or other shaped end which could be inserted into a slightly larger correspondingly shaped recess 14. The end 18 could be held in the recess 14 by means of, for example, a set screw or the like. The unthreaded portion of adaptor 16 is shaped to enable its attachment in heat conductive relationship to the heating element of a plurality of different makes and models of pencil type soldering irons 20.

For example, if the soldering iron 20 is a Weller* Model TCP-1 manufactured by Cooper Industries, Inc., the adaptor 16 would be provided with a radially extending welt 22. After removal of the soldering tip (not shown) that is normally provided with the soldering iron 20 the adaptor 16 is inserted in the soldering iron tip retaining tube 24. The welt 22 engages the inside surface of the crimped end of tube 24 to hold the adaptor 16 between the crimped end and in engagement with the heating element 26. Heat will then flow from heating element 26 to head member 12 via adaptor 16. The adaptor 16 can also be provided with a special metallic end portion 17 which

*Registered Trademark exhibits predetermined magnetic characteristics depending on the amount of heat applied thereto. Such metallic end portions 17 are required when the soldering iron 20 is of the type which has an automatic temperature control means (not shown) capable of sensing changes in the aforementioned magnetic characteristics to thereby control energization of heating element 26.

As a further example, if the soldering iron 20 is a Hexacon Model 23A manufactured by Hexacon Electric Co., the unthreaded portion of adaptor 16 would be of constant diameter and would slide into the recess 28 vacated by removal of the soldering iron tip (not shown). The adaptor 16 would be held in the recess 28 by means of set screw 30. Again heat would flow from the heating element 26 to head member 12 via adaptor 16.

As a still further example, if the soldering iron is an Ungar manufactured by Eldon Industries, Inc., the heating element 29 is removable and has a threaded end portion 31 to which is normally attached a soldering tip (not shown). The threaded end portion 31 can be directly connected to the threaded longitudinal bore 14 of the head member 12.

The head member 12 has a transverse bore 32 extending therethrough adjacent the other end thereof. The bore 32 is at an angle of approximately forty-five degrees with respect to the longitudinal axis of rotation of the head member 12. A replaceable hollow tip 34 has a portion thereof slidably disposed in one end of the bore 32 in heat conductive relationship to the head member 12. The tip 34 is made of a metal such as copper and can be maintained at any desired position relative to head member 12 by means of a set-screw 38. Thus, if there is a danger of the heated head member 12 coming in contact with wires or circuit elements extending above a workpiece such as a printed circuit board, the tip 34 can be quickly extended a sufficient distance outside of bore 32 to prevent head member 12 from making such contact. Another tubular member 40 has one end thereof positioned and secured in the other end of bore 32 to an extent that a portion of the member 40 overlaps and is concentric with a portion of the tip 34.

A mounting member 42 having axially aligned adjacent, hollow, cylindrical shaped portions 44 and 46 is placed over tubular member 40 and is concentric therewith. Cylindrical portion 44 is secured to tubular member 40 by friction or other suitable means. Cylindrical portion 46 is spaced from tubular member 40 and forms a radially extending recess 48 therebetween. The mounting member 42 has a bore 50 located adjacent cylindrical portion 44 and extending through the cylindrical portion 46 from the recess 48. A tubular member 52 is positioned and secured in the bore 50 to which is attached a hose 54 for transmitting a suction from a source as will be more fully described later.

The outer surface of portion 46 has a radially extending ridge 56 adjacent to and around which is located a bushing seal 58 made of an elastomeric material such as silicone rubber or the like. A melted solder receiving tube or receptacle 60 has one end thereof positioned over the bushing 58 in air-tight sealing engagement therewith. The receptacle 60, tubular member 40 and hollow tip 34 are all coaxial such that a straight in-line path is formed therebetween. The in-line path facilitates the movement of melted solder from the tip 34 to the receptacle 60 and eliminates clogging frequently experienced if there is a bend in the path. The receptacle 60 may take various forms, however, in the illustrated form of the invention it comprises a cylindrical tube of heat resistant glass having a smooth inner bore 62 to prevent the melted solder from permanently adhering thereto.

The other end of the receptacle tube is closed by a cup 64 also made of resilient elastomeric material such as silicone rubber or the like. The cup 64 has a cylindrical bore 66 into which the end of the receptacle tube 60 is inserted to be frictionally engaged thereby in air-tight sealing relationship. Radially extending spaced-apart ribs 65 are integrally formed with the cup 64 and serve to reduce radial expansion of the side wall 67 thus insuring tighter sealing engagement with receptacle 60. The ribs 65 and the air space formed between the ribs and the side wall 67 also acts to insulate the operator's fingers from the heat of the receptacle 60 whenever it is desired to remove the cap 64 for cleaning during operation of the device.

A washer-shaped filter 68 of fiberous material is provided having a cylindrical bore 70 which is slightly smaller in diameter than the external diameter of tubular member 40. The filter 68 is positioned on the tubular member 40 and the slight diameter difference provides a snug fit therebetween. The filter 68 also closes the annular or toroidal open end of portion 46 to thereby prevent any melted solder, flux or other debris from entering recess 48 and from there back to the source of suction.

The hose 54 can be connected to a treadle controlled source of suction 72 such as the one disclosed in copending patent application Ser. No. 464,436, filed Apr. 26, 1974 entitled "Vacuum Supply and Control System".

When it is desired to remove a wire or component from a circuit board or the like, the soldering iron 20 is energized and the element 26 heated. Heat from the element 26 is transmitted through the adaptor 16 to head member 12, removable tip 34, and tubular member 40. The heated tip is placed in contact with the solder which causes it to melt. When the treadle operated valve 72 is actuated to its open position, a suction will be applied in the solder receiving receptacle 60. This suction will then be transmitted through tubular member 40 to tip 34 whereupon the melted solder will be withdrawn up through the tip and tubular member and deposited in the receptacle 60. Because the suction source 72 is connected to the mounting member 42 and recess 48, the air drawn through tip 34 and tubular member 40 undergoes a 180° reversal in its direction of travel as it enters receptacle 60. This reversal in the direction of air travel causes the melted solder, which is also sucked into the receptacle 60 to be thrown to the top of the receptacle adjacent the cup 64. When the melted solder contacts the smooth bore 62 it cools and hardens and can be easily removed.

The transparent glass receptacle permits the user to see when the receptacle is full or otherwise in need of cleaning. To remove the collected solder, clean the receptacle or replace the filter all that is normally necessary is that the operator apply finger pressure and slight rotary motion to the ribs 65 thereby removing the receptacle from bushing 58. The glass receptacle can also be easily cleaned by removing only cup 64.

Although generally not used for the purpose of applying solder, it is to be understood that solder in small amounts can be applied by the tip 34 when no suction is present therein.

The desoldering device of the present invention, as can be seen, is simple in its construction and efficient in its operation. It can be easily held in one hand by the user and controlled by means of a pedal or other remote control means thus leaving the user's other hand free to manipulate the workpiece. The novel adaptor permits the device to be easily connected to a plurality of different makes and models of pencil type soldering irons thus permitting the heating assembly to be easily replaced or eliminate the necessity of providing separate and complete soldering and desoldering devices. The solder receiving receptacle can be easily cleaned and does not require dismantling of the entire receptacle assembly.

While a preferred embodiment has been specifically disclosed, it is understood that the invention is not limited thereto, as many variations will be readily apparent to those skilled in the art and the invention is to be given its broadest possible interpretation within the spirit and scope of what is described and claimed.

What we claim is:

1. Apparatus including a single desoldering device adaptable for use with a plurality of different soldering irons, each iron having a different recess for accomodating a removable soldering tip, said apparatus comprising:
    a. a plurality of adaptor means, each having a different and distinct fitting adapted to uniquely correspond to one of said plurality of different soldering irons so that each adaptor means is removably securable at one end thereof in the recess of its corresponding soldering iron, the other ends of all said adaptor means opposite said one ends thereof having the same configuration to permit the removable mounting thereon of said single desoldering device, one of said adaptor means being removably secured at said one end thereof in the recess of its corresponding soldering iron and its said other end outwardly extending therefrom; and
    b. means comprising said single desoldering device for effecting desoldering removably mounted on the outwardly extending other end of said one adaptor means.

2. Apparatus including a single desoldering device connectable to a source of suction adaptable for use with a plurality of different soldering irons, each iron having a different recess for accommodating a removable soldering tip, said apparatus comprising:
   a. a head member having a longitudinally extending opening at one end thereof and a transverse bore adjacent the other end thereof,
   b. a plurality of adaptor means, each having a different and distinct fitting adapted to uniquely correspond to one of said plurality of different soldering irons so that each adaptor means is removably securable at one end thereof in the recess of its corresponding soldering iron, the other ends of all said adaptor means opposite said one ends thereof having the same configuration to permit the removable mounting thereof in said longitudinally extending opening of said head member, one of said adaptor means being removably secured at said one end thereof in the recess of its corresponding soldering iron and its said other end outwardly extending therefrom, said head member being removably mounted on the outwardly extending other end of said one adaptor means,
   c. mounting means having a tubular member secured therethrough,
   d. a removable tubular tip inserted in said tubular member at one end thereof, said tubular member and tip having portions thereof disposed within said transverse bore of said head to be heated thereby,
   e. a hollow solder receptacle positioned on said mounting means such that the interior of said receptacle is in communication with said tubular member, and
   f. said source of suction being connected to said mounting member whereby any solder softened by said heating tip will be drawn through said tip and tubular member by said suction and deposited in said receptacle.

3. The desoldering device as set forth in claim 2 wherein said opening is threaded and said adaptor means is a metal rod threaded at one end for mating engagement with the threads in said opening, the other end of said rod being of substantially the same diameter as the recess in said soldering iron.

4. The desoldering device as set forth in claim 2 wherein said tubular tip is slidable in said transverse bore to a plurality of positions and means in said head member adjacent said transverse bore for retaining said tubular tip in any one said plurality of positions.

5. The desoldering device as set forth in claim 2 wherein said tubular tip, tubular member and solder receptacle are coaxial and arranged to form a straight in-line path to insure unobstructed flow of said softened solder therethrough.

6. The desoldering device as set forth in claim 2 wherein said mounting means has a wall portion spaced from said tubular member to form a radially extending recess between said wall portion and said tubular member, and said source of suction is connected to a tube extending through said wall into said recess.

7. The desoldering device as set forth in claim 6 further comprising a bushing of elastomeric material positioned on said wall portion and extending from said wall portion to said open end of said receptacle to form an airtight seal therebetween.

8. The desoldering device as set forth in claim 7 further comprising filter means positioned around said tubular member and adjacent said wall for preventing any of said softened solder from entering said radially extending means.

9. The desoldering device as set forth in claim 7 wherein said end of said receptacle is closed by means of a cup made of elastomeric material having a plurality of extending, spaced apart ribs integrally formed thereon.

10. A method for converting any one of a plurality of different soldering irons, each having a heating element and a different recess for accommodating a removable soldering tip, to a desoldering tool utilizing a single desoldering device, said method comprising the steps of
   removing the said soldering tip from the said recess of an arbitrary one of said soldering irons;
   removably securing one of a plurality of different and distinct adaptors in the said recess of said arbitrary soldering iron in place of the removed soldering tip, said plurality of adaptors respectively uniquely corresponding to said plurality of different soldering irons so that each adaptor is removably securable at one end thereof in the recess of its corresponding soldering iron, the other ends of all said adaptor means opposite said one ends thereof having the same configuration to permit the removable mounting thereon of said single desoldering device, said one adaptor corresponding to said arbitrary soldering iron;
   removably attaching said single desoldering device to said one adaptor, said desoldering device including (a) conduit means for removing solder or the like under the influence of a vacuum and transporting it to a collection chamber and (b) means for conducting heat from the heating element of said soldering iron to said conduit means to melt said solder when it is being removed to said collection chamber
   whereby any one of said soldering irons can be converted to a desoldering tool utilizing only said single desoldering device and the adaptor uniquely corresponding to that soldering iron.